(12) United States Patent
Wang et al.

(10) Patent No.: US 12,015,770 B2
(45) Date of Patent: Jun. 18, 2024

(54) METHOD FOR ENCODING VIDEO DATA, DEVICE, AND STORAGE MEDIUM

(71) Applicant: BIGO TECHNOLOGY PTE. LTD., Singapore (SG)

(72) Inventors: Xinning Wang, Guangdong (CN); Qing Liu, Guangdong (CN); Leju Yan, Guangdong (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 83 days.

(21) Appl. No.: 17/773,276

(22) PCT Filed: Aug. 24, 2020

(86) PCT No.: PCT/CN2020/110839
§ 371 (c)(1),
(2) Date: Apr. 29, 2022

(87) PCT Pub. No.: WO2021/082667
PCT Pub. Date: May 6, 2021

(65) Prior Publication Data
US 2023/0144483 A1   May 11, 2023

(30) Foreign Application Priority Data
Oct. 31, 2019  (CN) .......................... 201911052440.0

(51) Int. Cl.
*H04N 19/114* (2014.01)
*H04N 19/115* (2014.01)
(Continued)

(52) U.S. Cl.
CPC ......... *H04N 19/115* (2014.11); *H04N 19/114* (2014.11); *H04N 19/146* (2014.11); *H04N 19/177* (2014.11)

(58) Field of Classification Search
None
See application file for complete search history.

(56) References Cited

U.S. PATENT DOCUMENTS

2001/0055337 A1   12/2001   Matsuzaki et al.
2016/0150229 A1   5/2016   Jun et al.
(Continued)

FOREIGN PATENT DOCUMENTS

CN   102457728 A   5/2012
CN   105049856 A   11/2015
(Continued)

OTHER PUBLICATIONS

Extended European Search Report Communication Pursuant to Rule 62 EPC, dated Dec. 7, 2022 in Patent Application No. EP 20881226.3, which is a foreign counterpart application to which this application claims priority.
(Continued)

*Primary Examiner* — Samuel D Fereja
(74) *Attorney, Agent, or Firm* — Kolitch Romano Dascenzo Gates LLC

(57) ABSTRACT

Provided is a method for encoding video data. The method includes: acquiring video data; configuring an encoding parameter of an encoder; determining a first time interval between two adjacent video frames in a group of pictures based on the encoding parameter; and adjusting a number of video frames in the group of pictures based on the first time interval by encoding the video data based on the encoding parameter. A device and a storage medium are also provided.

18 Claims, 3 Drawing Sheets

(51) Int. Cl.
  *H04N 19/146*    (2014.01)
  *H04N 19/177*    (2014.01)

(56) References Cited

U.S. PATENT DOCUMENTS

2017/0359601 A1* 12/2017 Sievers ................ H04N 9/8205
2019/0253718 A1* 8/2019 Mao ..................... H04N 19/172

FOREIGN PATENT DOCUMENTS

| CN | 107623851 A | 1/2018 |
| CN | 109120933 A | 1/2019 |
| CN | 110381316 A | 10/2019 |
| CN | 110784718 A | 2/2020 |
| JP | 2002010259 A | 1/2002 |
| JP | 2002232893 A | 8/2002 |

OTHER PUBLICATIONS

Anonymous, android—How to configure specific GOP size in MediaCodec with Key_I_Frame_Interval parameter?—Stack Overflow, obtained at: https://stackoverflow.com/questions/22234523/how-to-configure-specific-gop-size-in-mediacodec-with-key-i-frame-interval-param; pp. 1-2, the whole document; Mar. 23, 2017.

Anonymous, NVENC_ VideoEncoder_ API_PG-06155-001_ v04 Jul. 2014 NVENC-NVIDIA Video Encoder Interface, pp. 1-24, section [2.7 Initializing the Hardware Encoder Session], section [7.3 Reconfigure API]; Aug. 4, 2014.

Anonymous, NVENC—NVIDIA Hardware Videoencoder NVENC_ DA-06209-001_ v04 Jul. 2014, pp. 1-14, the whole document; Aug. 4, 2014.

Anonymous, [Linphone—developers] A question about the configuration of mediacodec, pp. 1-2, the whole document; Jan. 26, 2018.

International Search Report of the International Searching Authority for State Intellectual Property Office of the People's Republic of China in PCT application No. PCT/CN2020/110839 dated Nov. 25, 2020, which is an international application corresponding to this U.S. application.

The State Intellectual Property Office of People's Republic of China, First Office Action in Patent Application No. CN201911052440.0 dated Mar. 23, 2021, which is a foreign counterpart application corresponding to this U.S. Patent Application, to which this application claims priority.

* cited by examiner

METHOD FOR ENCODING VIDEO DATA, DEVICE, AND STORAGE MEDIUM

CROSS-REFERENCE TO RELATED APPLICATION

This application is a US national stage of international application No. PCT/CN2020/110839, filed on Aug. 24, 2020, which claims priority to Chinese Patent Application No. 201911052440.0, filed on Oct. 31, 2019 and entitled "VIDEO DATA ENCODING METHOD AND DEVICE, EQUIPMENT AND STORAGE MEDIUM," the disclosures of which are herein incorporated by reference in their entireties.

TECHNICAL FIELD

The present disclosure relates to the technical field of video encoding, and in particular, to a method for encoding video data, a device, and a storage medium.

BACKGROUND

Upon a video recording device recording images, the recorded images are encoded by an encoder to form video data, and the video data is decoded and then played, such that video images are displayed on a terminal.

SUMMARY

Embodiments of the present disclosure provide a method and apparatus for encoding video data, a device, and a storage medium.

An embodiment of the present disclosure provides a method for encoding video data applicable to an encoder. The method includes:
acquiring video data;
configuring an encoding parameter of the encoder;
determining a first time interval between two adjacent video frames in a group of pictures (GOP) based on the encoding parameter; and
adjusting a number of video frames in the GOP based on the first time interval by encoding the video data based on the encoding parameter.

An embodiment of the present disclosure provides an apparatus for encoding video data applicable to an encoder. The apparatus includes:
a video data acquiring module, configured to acquire video data;
an encoding parameter configuring module, configured to configure an encoding parameter of the encoder;
a first time interval determining module, configured to determine a first time interval between two adjacent video frames in a GOP based on the encoding parameter; and
an encoding module, configured to adjust a number of video frames in the GOP based on the first time interval by encoding the video data based on the encoding parameter.

An embodiment of the present disclosure provides a device, including:
one or more processors; and
one or more memories, configured to store one or more programs;
wherein the one or more processors, when running the one or more programs, are caused to perform the method for encoding video data as defined in any one of the embodiments of the present disclosure.

An embodiment of the present disclosure provides a computer-readable storage medium. The computer-readable storage medium stores a computer program. The computer program, when run by a processor, causes the processor to perform the method for encoding video data as defined in any one of the embodiments of the present disclosure.

DETAILED DESCRIPTION

The present disclosure is described hereafter with reference to the accompanying drawings and embodiments. Only part of the structures related to the embodiments of the present disclosure rather than all the structures are shown in the accompanying drawings.

In encoders of some systems, encoded video frames include I-frames, P-frames, and B-frames. Video frames between two I-frames constitute one group of pictures (GOP). In other words, one GOP includes a plurality of video frames. On the premise that a bitrate is constant, the more the video frames in one GOP are, the better the image quality of a video is. However, in the case that the GOP includes too many video frames, when decoding a P-frame or a B-frame in the GOP, an I-frame and first N predicted frames in the GOP need to be first decoded, resulting in a long decoding time.

In some scenarios, a specific frame needs to be quickly decoded. To reduce the decoding time, the number of frames in a GOP needs to be fewer. However, in encoders of some systems, for example, in an Android system, due to a limitation of a hardware encoding chip, a minimum unit of an encoding period for the encoder to encode one GOP is seconds. Only one I-frame can be encoded in the encoding period, and all video frames received in one encoding period are encoded into one GOP. In the case that a frame rate of received video data is constant, a number of video frames in the GOP is an integral multiple of the frame rate. Consequently, the encoder cannot acquire video data including a GOP with an arbitrary number of frames through encoding. Although a software encoder can meet the requirement, an encoding speed of the software encoder is low, and many system resources are occupied.

Embodiment 1

Figure 1A:
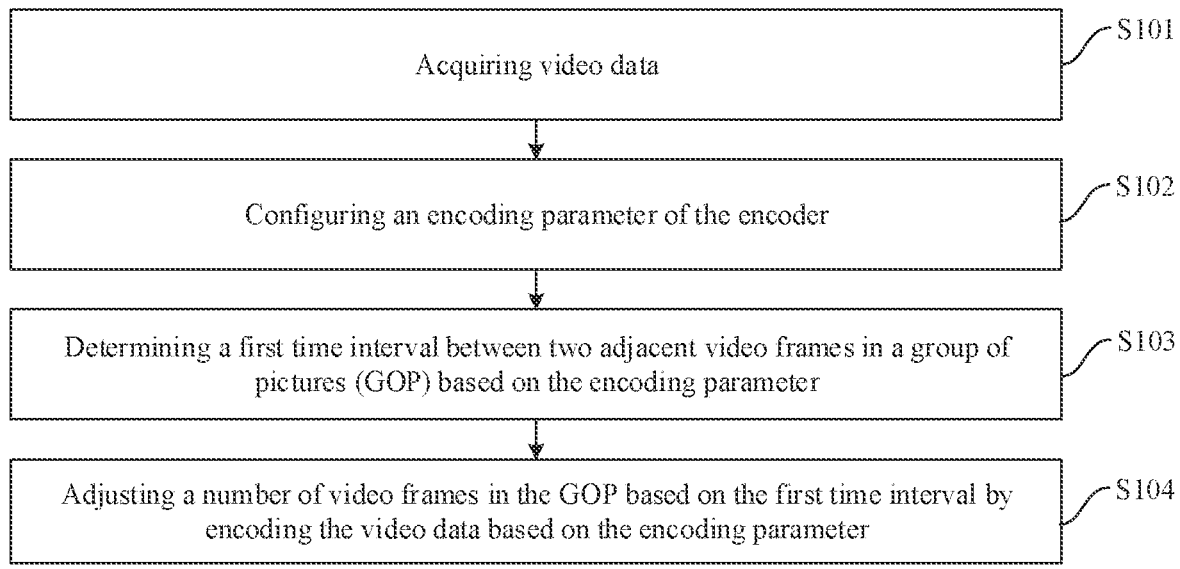
FIG. 1A is a flowchart of a method for encoding video data according to Embodiment 1 of the present disclosure.

FIG. 1A is a flowchart of a method for encoding video data according to Embodiment 1 of the present disclosure. This embodiment of the present disclosure is applicable to the case of video data encoding. The method may be performed by an apparatus for encoding video data. The apparatus may be implemented by software and/or hardware and integrated into a device for performing the method. As shown in FIG. 1A, the method may include the following processes.

In S101, video data is acquired.

In this embodiment of the present disclosure, the video data may be a sequence of original images acquired by an image acquisition device. The image acquisition device may be a terminal with a camera, for example, may be a mobile electronic device such as a mobile phone or a camera, or may be a fixed electronic device with a camera such as a fixed monitoring camera.

In this embodiment of the present disclosure, the electronic device is provided with a hardware encoder, such as various encoding chips. The encoding chips may encode the sequence of the original images acquired by the camera to acquire video data with specifications set by a user. The encoder receives the video data from an output end of the camera after the camera starts to capture images. The encoder may alternatively be an independent device. The independent encoder may receive and read the video data from a device such as a network server, a host, or a memory.

In S102, an encoding parameter of the encoder is configured.

In this embodiment of the present disclosure, the encoding parameters may include an encoding frame rate, an encoding bitrate, and an encoding period of the encoder in an encoding process. The encoding frame rate is a number of video frames encoded by the encoder per second. The encoding bitrate is a volume of data encoded by the encoder per second. The encoding period is a period for encoding one GOP by the encoder.

In practical terms, the user may set a target frame rate, a target bitrate, and a target number of frames in the GOP of encoded video data. For example, the user inputs the target frame rate, the target bitrate, and the target number of frames in the GOP required for the encoded video data on an interactive interface of the encoder. The target frame rate may be a number of video frames played per second during the playing process of the encoded video data. The target bitrate may be a volume of data transmitted per second during a transmitting process of the encoded video data. The target number of frames may be a number of video frames in the GOP in the encoded video data.

Upon receiving the target frame rate, the target bitrate, and the target number of frames in the GOP, the encoder configures the encoding frame rate and the encoding bitrate of the encoder based on the target frame rate, the target bitrate, the target number of frames in the GOP, and the encoding period for encoding one GOP by the encoder, such that the video data can be encoded using the configured encoding bitrate and encoding frame rate in the encoding process.

In S103, a first time interval between two adjacent video frames in the GOP is determined based on the encoding parameter.

Figure 1B:
FIG. 1B is a schematic diagram of GOPs in video data according to an embodiment of the present disclosure.

As shown in FIG. 1B, one GOP includes a key frame (I-frame) and a plurality of predicted frames (P-frames or B-frames). The encoding period is the period for encoding one GOP. That is, the encoding period indicates a time interval at which the encoder encodes one key frame. In the case that the encoding period is constant, a number of video frames in one GOP is negatively correlated with the time interval between two adjacent video frames in the GOP. In other words, the greater the time interval is, the fewer the video frames in one GOP are.

In this embodiment of the present disclosure, upon configuring the encoding parameter, the time interval between two adjacent video frames in one GOP may be calculated based on the encoding frame rate. For example, the encoder encodes one key frame at an interval of 1 second to form a GOP. In this case, the encoding period is 1 second. A ratio of 1 to the encoding frame rate may be calculated as the time interval between two adjacent video frames in the GOP.

In S104, the number of video frames in the GOP is adjusted based on the first time interval by encoding the video data based on the encoding parameter.

In practical terms, the video data includes a timestamp. The timestamp indicates a time point at which a video frame is displayed. Upon determining the first time interval between two adjacent video frames in the GOP based on the encoding parameter, an encoding timestamp of the encoder in the encoding process may be acquired by adjusting the timestamp of the video data based on the first time interval. The encoder encodes a corresponding video frame based on the time point in the encoding timestamp. Optionally, in the case that the encoder encodes the video data using the configured encoding bitrate and the encoding period, a start time point corresponding to each encoding period is determined based on the encoding timestamp and the encoding period. A video frame corresponding to the start time point is encoded as a key frame, and video frames corresponding to other time points in the encoding period are encoded as predicted frames to acquire one GOP. A time interval between two adjacent video frames in the GOP is equal to the first time interval. In other words, a time interval between two adjacent video frames in the GOP may be determined by configuring the encoding parameter of the encoder, such that the number of video frames in the GOP may be adjusted based on the time interval.

In this embodiment of the present disclosure, upon configuring the encoding parameter of the encoder, the time interval between two adjacent video frames in the GOP is determined based on the encoding parameter, such that in the case that the video data is encoded based on the encoding parameter, the number of video frames in the GOP can be adjusted based on the time interval. In this embodiment of the present disclosure, in the case that a minimum unit of the encoding period is constant, the time interval between two adjacent video frames in the GOP is adjusted by configuring the encoding parameter, such that the number of video frames in the GOP generated through encoding in the encoding period can be adjusted, which achieves the encoding of a GOP with an arbitrary number of frames. Therefore, the problem that the number of frames in the GOP cannot be changed due to a limitation of a hardware encoding chip is solved. No software encoder is required for encoding, the encoding speed is high, and system resource consumption is low. The encoding requirement that the GOP includes fewer video frames is met, such that a specific frame can be quickly decoded when decoding the video data, and the decoding time is reduced.

Embodiment 2

Figure 2:
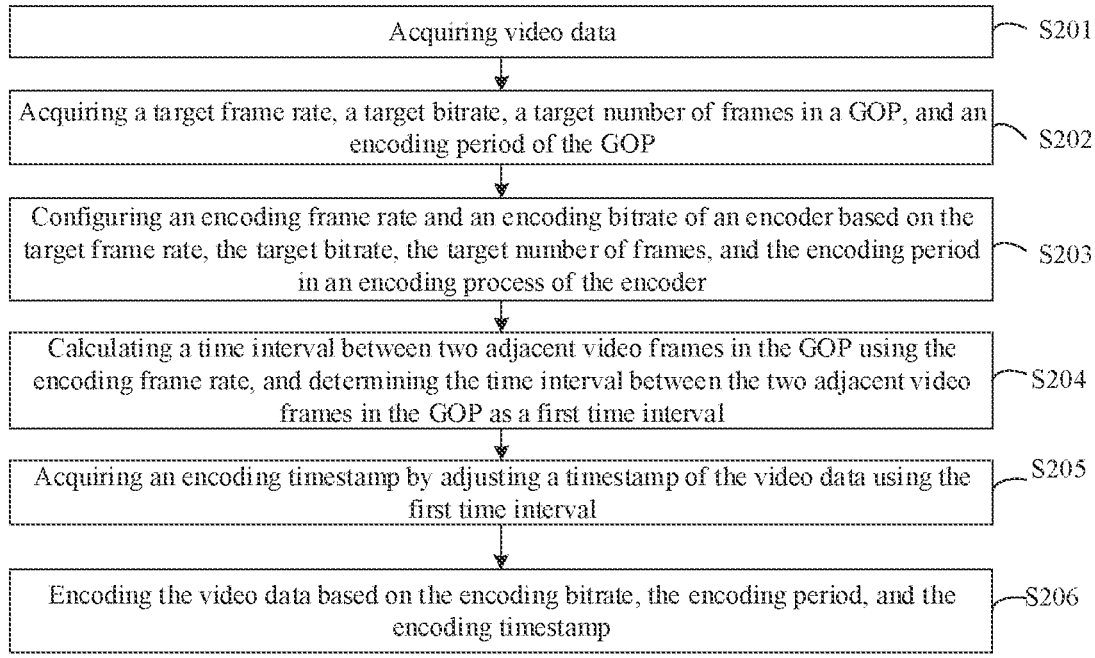
FIG. 2 is a flowchart of a method for encoding video data according to Embodiment 2 of the present disclosure.

FIG. 2 is a flowchart of a method for encoding video data according to Embodiment 2 of the present disclosure. This embodiment of the present disclosure is described based on Embodiment 1. As shown in FIG. 2, the method may include the following process.

In S201, video data is acquired, wherein the video data includes a timestamp.

In this embodiment of the present disclosure, the video data may include a plurality of video frames and the timestamp. For example, during live streaming of a user, a camera acquires the plurality of video frames and a time point at which each video frame is captured by capturing images of the user, wherein a time sequence formed by the capturing time points of the plurality of video frames is the timestamp.

In S202, a target frame rate, a target bitrate, a target number of frames in a GOP, and an encoding period of the GOP are acquired.

In practical terms, the user may set the target frame rate, the target bitrate, the target number of frames in the GOP, and the encoding period of encoded video data. For example, the user inputs the target frame rate, the target bitrate, the target number of frames in the GOP, and the encoding period required for the encoded video data on an interactive interface of an encoder. The encoding period may be an integral multiple of 1 second. For example, in an Android system, in the case that the encoding period for encoding the GOP by an encoding chip is set in a unit of seconds, the encoding period may be set to 1 second, 2 seconds, or the like. In the case that the user sets the foregoing parameters on the encoder, the encoder can receive the parameters set by the user.

Optionally, the encoding period is an integral multiple of 1 second.

In S203, an encoding frame rate and an encoding bitrate of the encoder are configured based on the target frame rate, the target bitrate, the target number of frames, and the encoding period in the encoding process of the encoder.

In an optional embodiment of the present disclosure, the target frame rate, the target number of frames, and the encoding period may be used to calculate a conversion factor, and the encoding frame rate and the encoding bitrate can be acquired by converting the target frame rate and the target bitrate based on the conversion factor.

In an embodiment, a first product may be acquired by calculating a product of the target number of frames and the encoding period. The conversion factor may be acquired by calculating a ratio of the target frame rate to the first product. The conversion factor is a conversion factor between the target frame rate and the encoding frame rate and a conversion factor between the target bitrate and the encoding bitrate. Upon acquiring the conversion factor, the encoding frame rate can be acquired by calculating a ratio of the target frame rate to the conversion factor, and the encoding bitrate can be acquired by calculating a ratio of the target bitrate to the conversion factor.

The following describes how to configure the encoding bitrate and the encoding frame rate by taking an encoder in the Android system as an example.

The user sets the target frame rate of the encoded video data to fps, the target bitrate of the encoded video data to bitrate, and the target number of frames in the GOP in the encoded video data to GOP_SIZE on the encoder, and the encoder sets a minimum unit of the encoding period to seconds.

In the case that the user sets the encoding period to 1 second, the conversion factor GOPFactor is calculated as follows: GOPFactor=fps/GOP_SIZE. In the case that the user sets the encoding period to N×1 seconds, the conversion factor GOPFactor is calculated as follows: GOPFactor=fps/GOP_SIZE/N. For example, the user needs to record a video with a target frame rate of 30 frames per second, a target bitrate of 3 Mbit/s, and a GOP including 10 frames as the target number of frames. In this case, the target frame rate fps=30, the target bitrate bitrate=3×1024×1024, and the target number of frames GOP_SIZE=10. In the case that the encoding period for encoding one GOP by the encoder is 1 second, the conversion factor GOPFactor=30/10=3.

Upon determining the conversion factor GOPFactor, the encoding parameters of the encoder may be configured as follows:
AMediaFormat_setInt32(videoFormat, "bitrate", bitrate/GOPFactor)
AMediaFormat_setInt32(videoFormat, "frame-rate", fps/GOPFactor)
AMediaFormat_setInt32(videoFormat, "i-frame-interval", 1)

In other words, in the case that the user needs to record video data with the target frame rate of 30 frames per second, the target bitrate of 3 Mbit/s, and having the GOP including 10 frames as the target number of frames, the following processes may be performed.

The encoding bitrate is set to 1 Mbit per second through AMediaFormat_setInt32(videoFormat, "bitrate", bitrate/GOPFactor).

The encoding frame rate is set to 10 frames per second through AMediaFormat_setInt32(videoFormat, "frame-rate", fps/GOPFactor).

The encoding period of the GOP is set to 1 second through AMediaFormat_setInt32(videoFormat, "i-frame-interval", 1).

In this embodiment of the present disclosure, in the case that the encoding period for encoding the GOP is in a unit of seconds, the encoding bitrate and the encoding frame rate of the encoder in the encoding process may be acquired by converting the target bitrate and the target frame rate based on the target frame rate, the target bitrate, and the target number of frames in the GOP of the video data required by the user. Therefore, the encoder can be configured based on the encoding bitrate and the encoding frame rate and can be controlled to encode the video data using the encoding frame rate and the encoding bitrate. In this way, the GOP in the encoded video data can meet specified requirements of the user.

In S204, a time interval between two adjacent video frames in the GOP is calculated using the encoding frame rate, and the time interval between the two adjacent video frames in the GOP is determined as a first time interval.

In an embodiment, the encoding frame rate indicates a number of video frames encoded by the encoder per second in the encoding process of the video data. A ratio of 1 to the encoding frame rate may be calculated, and the ratio is determined as the time interval between two adjacent video frames in the GOP. For example, in the case that the encoding frame rate is 10, the time interval is 100 milliseconds.

In S205, an encoding timestamp is acquired by adjusting the timestamp of the video data using the first time interval.

The video data includes the timestamp. The timestamp indicates a time interval between two video frames when recording the video data. Because the target frame rate is converted to the encoding frame rate using the conversion factor, the timestamp of the video data is needed to be adjusted to make a time interval between two adjacent video frames in the adjusted timestamp (i.e. the encoding timestamp) is equal to the first time interval.

For example, the target frame rate fps is 30, and a frame rate of the video data that is not encoded is usually also 30. In this case, the time interval between two video frames in the video data that is not encoded is 33 milliseconds, that is, a time interval between two adjacent video frames in the timestamp of the video data that is not encoded is 33 milliseconds. The encoding frame rate of the encoder acquired by converting the target frame rate fps using the conversion factor is 10, and a required time interval between two video frames is 100 milliseconds in the encoding process. To ensure that the encoding can be correctly performed, the time interval between two video frames in the timestamp of the video data needs to be adjusted from 33 milliseconds to 100 milliseconds, such that the encoding frame rate can match the encoding timestamp, and the encoder can correctly perform the encoding. For example, the encoding frame rate is 10, the time interval between two adjacent frames in the encoding timestamp is 100 milliseconds, and the frame rate calculated using the encoding timestamp is also 10. That is, in the case that the video data is encoded based on the encoding timestamp, the encoding frame rate is 10. Conversely, in the case that the encoding is performed based on the encoding frame rate of 10, the time interval between two adjacent frames in the encoding timestamp is 100 milliseconds.

In S206, the video data is encoded based on the encoding bitrate, the encoding period, and the encoding timestamp.

In an optional embodiment of the present disclosure, an encoding time of the video frame in the video data may be acquired from the encoding timestamp. Video frames in one GOP are determined based on the encoding time and the encoding period. Video frames in a plurality of GOPs are encoded based on the encoding bitrate, to acquire the encoded video data including the plurality of GOPs. A timestamp of the encoded video data is acquired by adjusting the encoding timestamp.

In an embodiment, in the case that the encoding timestamp indicates a time point at which the video frame is encoded in the encoding process, the encoding time of the video frame may be acquired from the encoding timestamp. A start video frame and an ending video frame in the GOP are determined based on the encoding period and the encoding time. The start video frame, the end video frame, and video frames between the start video frame and the end video frame are determined as the video frames in the GOP.

For example, the encoding period is 1 second, and the time interval between two adjacent video frames in the encoding timestamp is 100 milliseconds. In the case that the encoder receives video frames, a time point of a first video frame is 0 milliseconds, a time point of a second video frame is 100 milliseconds, and a time point of a third video frame is 200 milliseconds. By analogy, the time point of a tenth video frame is 900 milliseconds. That is, in the case that the encoding period is 1 second, the first video frame may be determined as a start video frame in a GOP, and the tenth video frame may be determined as an end video frame in the GOP. The first video frame to the tenth video frame are all video frames in the same GOP. An eleventh video frame is a start video frame in a next GOP, and a twentieth video frame is an end video frame in the next GOP. The eleventh video frame to the twentieth video frame are all video frames in the next GOP. By analogy, all video frames in the video data are divided into a plurality of GOPs.

For the video frames in each GOP, when encoding the video frames in the plurality of GOPs using the encoding bitrate, the start video frame is encoded as a key frame, and video frames behind the start video frame in each GOP are encoded as predicted frames, such that the plurality of GOPs shown in FIG. 1B are acquired.

Alternatively, the video frames may be read based on the encoding timestamp and encoded in the encoder, wherein a video frame read at the beginning of each encoding period is encoded as a key frame, and other video frames read in the encoding period are encoded as predicted frames. Alternatively, the video data may be read based on the encoding timestamp and time may be counted, and one video frame is encoded as a key frame at the interval of one encoding period, or a time point at which a video frame is to be encoded as a key frame is marked on the encoding timestamp based on the encoding period in advance, and a video frame is encoded as the key frame at the time point.

In the encoded video data, the number of video frames in the GOP is equal to the target number of frames. However, the encoding frame rate is different from the target frame rate. To acquire video data whose frame rate is the target frame rate, a second time interval may be acquired by calculating a time interval between two adjacent video frames in the encoded video data based on the target frame rate. The time interval between two adjacent video frames in the encoding timestamp is adjusted to the second time interval. The second time interval is not equal to the first time interval.

For example, in the case that the encoding frame rate is 10, the time interval between the two adjacent video frames in the encoding timestamp is 100 milliseconds. In the case that this encoding timestamp is determined as the timestamp of the encoded video data, the frame rate of the encoded video data is 10, which obviously does not match the target frame rate of 30, and cannot meet the user's requirement. Therefore, a required time interval between two video frames in the encoded data may be calculated based on the target frame rate of 30 as 33 milliseconds, and the time interval between two video frames in the encoding timestamp is changed from 100 milliseconds to 33 milliseconds to make the frame rate of the encoded video data be the target frame rate of 30, that is, the number of video frames played per second is changed from 10 frames to 30 frames. Due to the change in the number of frames played per second, the frame rate is changed from the encoding frame rate to the target frame rate, making the frame rate of the encoded video data be the target frame rate, the bitrate of the encoded video data be the target bitrate, and the number of video frames in each GOP of the encoded video data be the target number of frames.

In embodiments of the present disclosure, in the case that the minimum unit of the encoding period is constant, upon acquiring the target frame rate, the target bitrate, the target number of frames in the GOP, and the encoding period of the required video data, the encoding frame rate and the encoding bitrate are calculated using the target frame rate, the target bitrate, the target number of frames in the GOP, and the encoding period. The time interval between two adjacent video frames is calculated using the encoding frame rate, such that the encoding timestamp can be acquired by adjusting the timestamp of the video data using the time interval. Upon encoding the video data based on the encoding bitrate, the encoding period, and the encoding timestamp, the video data including GOP with the target number of video frames, and having the target frame rate and the target bitrate is acquired. Therefore, the encoding of the GOP with an arbitrary number of frames is achieved, the problem that the number of frames in the GOP cannot be changed due to a limitation of a hardware encoding chip is solved without using a software encoder for encoding, the speed is high, and system resource consumption is low. The encoding requirement that the GOP includes fewer video frames is met, such that a specific frame can be quickly decoded in the decoding process of the video data, and the decoding time is reduced.

Embodiment 3

Figure 3:
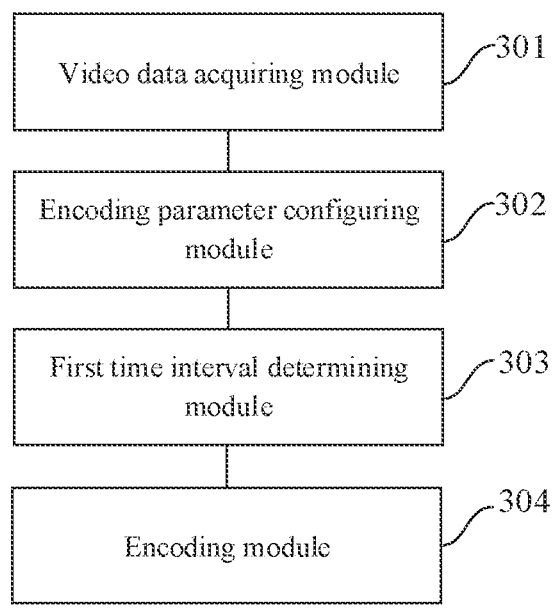
FIG. 3 is a structural block diagram of an apparatus for encoding video data according to Embodiment 3 of the present disclosure.

FIG. 3 is a structural block diagram of an apparatus for encoding video data according to Embodiment 3 of the present disclosure. As shown in FIG. 3, the apparatus for encoding video data in this embodiment of the present disclosure is applicable to an encoder, and the apparatus may include a video data acquiring module 301, an encoding parameter configuring module 302, a first time interval determining module 303, and an encoding module 304.

The video data acquiring module 301 is configured to acquire video data.

The encoding parameter configuring module 302 is configured to configure an encoding parameter of the encoder.

The first time interval determining module 303 is configured to determine a first time interval between two adjacent video frames in a GOP based on the encoding parameter.

The encoding module 304 is configured to adjust a number of video frames in the GOP based on the first time interval by encoding the video data based on the encoding parameter.

The apparatus for encoding video data according to this embodiment of the present disclosure may perform the method for encoding video data as defined in any embodiment of the present disclosure and has corresponding functional modules for performing the method and can achieve corresponding effects.

Embodiment 4

Figure 4:
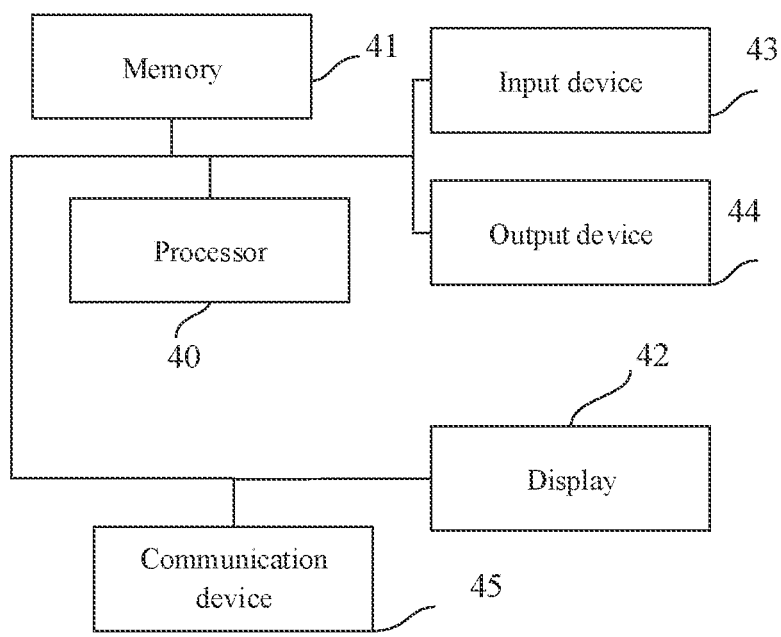
FIG. 4 is a structural block diagram of a device according to Embodiment 4 of the present disclosure.

FIG. 4 is a schematic structural diagram of a device according to an embodiment of the present disclosure. As shown in FIG. 4, the device may include a processor 40, a memory 41, a display 42 with a touch function, an input device 43, an output device 44, and a communication device 45. There may be one or more processors 40 in the device. One processor 40 is used as an example in FIG. 4. There may be one or more memories 41 in the device. One memory 41 is used as an example in FIG. 4. The processor 40, the memory 41, the display 42, the input device 43, the output device 44, and the communication device 45 in the device may be connected via a bus or in another manner. A connection via the bus is used as an example in FIG. 4.

The processor 40, when running one or more software programs, one or more instructions, or one or more modules stored in the memory 41, is caused to execute various functional applications of the device and perform data processing, that is, to perform the foregoing method for encoding video data.

An embodiment of the present disclosure further provides a computer-readable storage medium. One or more computer programs in the storage medium, when run by a processor of a device, cause the device to perform the method for encoding video data as defined in the foregoing method embodiments.

Embodiments of the apparatus, device, and storage medium are similar to the method embodiments, so the apparatus, device, and storage medium are just described simply, and reference can be made to the description of the method embodiments.

The embodiments of the present disclosure may be implemented by software and necessary general-purpose hardware, or hardware. The present disclosure can be embodied in the form of a software product. The computer software product may be stored in a computer-readable storage medium, such as a floppy disk of a computer, a read-only memory (ROM), a random access memory (RAM), a flash memory, a hard disk, or an optical disc, and include a plurality of instructions, wherein the plurality of instructions, when run by a processer of a computer device, cause the computer device (which may be a robot, personal computer, server, network device, or the like) to perform the method for encoding video data as defined in any embodiment of the present disclosure.

The units and modules included in the apparatus for encoding video data are merely divided based on functional logic, but are not limited to the foregoing division, any division ways can be adopted as long as the corresponding functions can be implemented. In addition, names of the functional units are merely for differentiation and are not used to limit the protection scope of the present disclosure.

What is claimed is:

1. A method for encoding video data, applicable to an encoder, the method comprising:
   acquiring video data;
   configuring an encoding parameter of the encoder;
   determining a first time interval between two adjacent video frames in a group of pictures (GOP) based on the encoding parameter; and
   adjusting a number of video frames in the GOP based on the first time interval by encoding the video data based on the encoding parameter;
   wherein configuring the encoding parameter of the encoder comprises:
   acquiring a target frame rate, a target bitrate, a target number of frames in the GOP, and an encoding period of the GOP;
   calculating a conversion factor using the target frame rate, the target number of frames, and the encoding period; and
   acquiring an encoding frame rate and an encoding bitrate by converting the target frame rate and the target bitrate based on the conversion factor.

2. The method according to claim 1, wherein calculating the conversion factor using the target frame rate, the target number of frames, and the encoding period comprises:
   acquiring a first product by calculating a product of the target number of frames and the encoding period; and
   acquiring the conversion factor by calculating a ratio of the target frame rate to the first product.

3. The method according to claim 1, wherein the encoding period is an integral multiple of 1 second.

4. The method according to claim 1, wherein acquiring the encoding frame rate and the encoding bitrate by converting the target frame rate and the target bitrate based on the conversion factor comprises:
   acquiring the encoding frame rate by calculating a ratio of the target frame rate to the conversion factor; and
   acquiring the encoding bitrate by calculating a ratio of the target bitrate to the conversion factor.

5. The method according to claim 1, wherein the encoding parameter comprises the encoding frame rate, and determining the first time interval between the two adjacent video frames in the GOP based on the encoding parameter comprises:
   calculating a time interval between the two adjacent video frames in the GOP using the encoding frame rate, and determining the time interval between the two adjacent video frames in the GOP as the first time interval.

6. The method according to claim 1, wherein the video data comprises a timestamp, the encoding parameter comprises the encoding bitrate, and adjusting the number of video frames in the GOP based on the first time interval by encoding the video data based on the encoding parameter comprises:
   acquiring an encoding timestamp by adjusting the timestamp of the video data based on the first time interval; and encoding the video data based on the encoding bitrate, the encoding period, and the encoding timestamp.

7. The method according to claim 6, wherein encoding the video data based on the encoding bitrate, the encoding period, and the encoding timestamp comprises:
   acquiring encoding time of each video frame in the video data from the encoding timestamp;
   determining video frames in the GOP based on the encoding time and the encoding period;
   acquiring encoded video data comprising a plurality of GOPs by encoding video frames in the plurality of GOPs based on the encoding bitrate; and
   acquiring a timestamp of the encoded video data by adjusting the encoding timestamp.

8. The method according to claim 7, wherein determining the video frames in the GOP based on the encoding time and the encoding period comprises:
   determining a start video frame and an end video frame in the GOP based on the encoding period and the encoding time; and
   determining the start video frame, the end video frame, and video frames between the start video frame and the end video frame as the video frames in the GOP.

9. The method according to claim 8, wherein acquiring the encoded video data comprising the plurality of GOPs by encoding the video frames in the plurality of GOPs based on the encoding bitrate comprises:
   in response to encoding the video frames in the plurality of GOPs based on the encoding bitrate, encoding the start video frame as a key frame; and
   encoding video frames behind the start video frame in each of the GOPs as predicted frames.

10. The method according to claim 7, wherein the encoding parameter comprises the target frame rate, and acquiring the timestamp of the encoded video data by adjusting the encoding timestamp comprises:
    acquiring a second time interval by calculating a time interval between two adjacent video frames in the encoded video data based on the target frame rate; and
    adjusting a time interval between two adjacent video frames in the encoding timestamp to the second time interval, wherein the second time interval is not equal to the first time interval.

11. A device for encoding video data, comprising:
    one or more processors; and
    one or more memories, configured for storing one or more programs;
    wherein the one or more processors, when running the one or more programs, are caused to perform a method for encoding video data, the method comprising:
    acquiring video data;
    configuring an encoding parameter of the encoder;
    determining a first time interval between two adjacent video frames in a group of pictures (GOP) based on the encoding parameter; and
    adjusting a number of video frames in the GOP based on the first time interval by encoding the video data based on the encoding parameter;
    wherein configuring the encoding parameter of the encoder comprises:
    acquiring a target frame rate, a target bitrate, a target number of frames in the GOP, and an encoding period of the GOP;
    calculating a conversion factor using the target frame rate, the target number of frames, and the encoding period; and
    acquiring an encoding frame rate and an encoding bitrate by converting the target frame rate and the target bitrate based on the conversion factor.

12. The device according to claim 11, wherein calculating the conversion factor using the target frame rate, the target number of frames, and the encoding period comprises:
    acquiring a first product by calculating a product of the target number of frames and the encoding period; and
    acquiring the conversion factor by calculating a ratio of the target frame rate to the first product.

13. The device according to claim 11, wherein the encoding period is an integral multiple of 1 second.

14. The device according to claim 11, wherein acquiring the encoding frame rate and the encoding bitrate by converting the target frame rate and the target bitrate based on the conversion factor comprises:
    acquiring the encoding frame rate by calculating a ratio of the target frame rate to the conversion factor; and
    acquiring the encoding bitrate by calculating a ratio of the target bitrate to the conversion factor.

15. The device according to claim 11, wherein the encoding parameter comprises the encoding frame rate, and determining the first time interval between the two adjacent video frames in the GOP based on the encoding parameter comprises:
    calculating a time interval between the two adjacent video frames in the GOP using the encoding frame rate, and determining the time interval between the two adjacent video frames in the GOP as the first time interval.

16. The device according to claim 11, wherein the video data comprises a timestamp, the encoding parameter comprises the encoding bitrate, and adjusting the number of video frames in the GOP based on the first time interval by encoding the video data based on the encoding parameter comprises:
    acquiring an encoding timestamp by adjusting the timestamp of the video data based on the first time interval; and
    encoding the video data based on the encoding bitrate, the encoding period, and the encoding timestamp.

17. The device according to claim 16, wherein encoding the video data based on the encoding bitrate, the encoding period, and the encoding timestamp comprises:
    acquiring encoding time of each video frame in the video data from the encoding timestamp;
    determining video frames in the GOP based on the encoding time and the encoding period;
    acquiring encoded video data comprising a plurality of GOPs by encoding video frames in the plurality of GOPs based on the encoding bitrate; and
    acquiring a timestamp of the encoded video data by adjusting the encoding timestamp.

18. A non-transitory computer-readable storage medium, storing a computer program, wherein the computer program, when run by a processor, causes the processor to perform a method for encoding video data, the method comprising:
    acquiring video data;
    configuring an encoding parameter of the encoder;
    determining a first time interval between two adjacent video frames in a group of pictures (GOP) based on the encoding parameter; and
    adjusting a number of video frames in the GOP based on the first time interval by encoding the video data based on the encoding parameter;
    wherein configuring the encoding parameter of the encoder comprises:

acquiring a target frame rate, a target bitrate, a target number of frames in the GOP, and an encoding period of the GOP;

calculating a conversion factor using the target frame rate, the target number of frames, and the encoding period; and acquiring an encoding frame rate and an encoding bitrate by converting the target frame rate and the target bitrate based on the conversion factor.

* * * * *